United States Patent [19]

Fujie et al.

[11] Patent Number: 4,929,072
[45] Date of Patent: May 29, 1990

[54] SELF CLEANING MIRROR FOR A VEHICLE

[75] Inventors: Naofumi Fujie, Nagoya; Tomoaki Imaizumi, Hoi; Koji Ito, Kariya; Shoji Okada, Toyota, all of Japan

[73] Assignee: Aisin Seiki Kabushiki Kaisha, Kariya, Japan

[21] Appl. No.: 386,703

[22] Filed: Jul. 31, 1989

[30] Foreign Application Priority Data

Jul. 30, 1988 [JP] Japan .................................. 63-190967

[51] Int. Cl.⁵ .............................................. G02B 5/10
[52] U.S. Cl. ...................................... 350/582; 15/250 B
[58] Field of Search ............... 350/582, 588, 589, 590, 350/608, 623, 624, 631; 51/171; 15/250 B

[56] References Cited

U.S. PATENT DOCUMENTS

| 3,171,683 | 3/1965 | Ludwig | 350/582 |
| 4,387,973 | 6/1983 | Martin | 350/608 |
| 4,833,373 | 5/1989 | Doi et al. | 350/582 |

Primary Examiner—Bruce Y. Arnold
Assistant Examiner—J. Ryan
Attorney, Agent, or Firm—Burns, Doane, Swecker & Mathis

[57] ABSTRACT

An outside mirror of a vehicle has an ultrasonic vibrator attached to its rear side for removing water and the like from the front side of the mirror. The mirror is attached to a frame by means of a supporting member extending around an outer peripheral edge of the mirror. The supporting portion is formed of a material having less acoustic impedance than the mirror. The vibrator has electrode connectors connected to wires from a control device by being mechanically clamped to those wires.

9 Claims, 1 Drawing Sheet

SELF CLEANING MIRROR FOR A VEHICLE

BACKGROUND OF THE INVENTION

1. Technical Field of the Invention

The present invention relates to a cleaning device for cleaning a vehicle mirror in order to maintain proper visibility of the mirror surface, such as a fender mirror or door mirror and the like, and in particular to a cleaning device for removing water drops, ice, frost, mist and the like from the mirror surface.

2. Description of the Prior Art

An example of this kind of vehicle mirror cleaning device is disclosed in Japanese Laid Open Utility Model Sho-61-30552. FIG. 4 herein is a cross sectional view of that vehicle mirror cleaning device for a mirror mounted to the exterior of the vehicle.

The mirror comprises a mirror main body 32 carrying a glass mirror 31. Between the back mirror main body 32 and its support stay 33, an ultrasonic vibrator 34 made of ceramic is provided. To this ultrasonic vibrator 34, an operating switch 35 is connected, the switch controlled from the interior of the vehicle. Between the ultrasonic vibrator 34 and operating switch 35, a driving circuit 36 and power supply source 37 are connected in series.

The driving circuit 36 is for amplifying a signal generated by an oscillator and transmitting it to the ultrasonic vibrator 34 for vibrating the latter. That mirror cleaning device utilizing a conventional ultrasonic vibrator may operate as follows.

When water drops and the like are adhered on the mirror surface, the ultrasonic vibrator 34 is vibrated by operating the operating switch from within the car interior. The vibration of this ultrasonic vibrator 34 can remove the water drops and the like from the mirror surface by vibrating the entire body of back mirror main body 32.

However, in order to remove completely the water drops by said ultrasonic vibrator 34, the ultrasonic vibrator 34 should be vibrated by an effective vibrating mode to pulverize the water drops by the vibration of the mirror 31.

Further, the electric terminal mounted to the ultrasonic vibrator 34, vibrates with the predetermined vibrating frequency, whereupon as a result, the solder connection of the lead wire and electrode is broken, or the wire is cut. Therefore, it has been required to make the structure connecting the electrode of the ultrasonic vibrator 34 with the lead wire to be anti-vibrational.

OBJECT AND SUMMARY OF THE INVENTION

Therefore, it is a first object of the present invention to provide a mirror cleaning device for a vehicle capable of efficiently imparting a vibratory wave to a mirror surface.

A second object of the present invention is to provide a mirror cleaning device for a vehicle having a structure minimizing the stress imposed on the connecting portion between a lead wire and an electrode terminal of the ultrasonic vibrator.

The mirror cleaning device for vehicle according to the present invention has a mirror mounted to the mirror frame by means of a supporting member made from a material of less acoustic impedance than the mirror. Hence, only the mirror is subjected to the vibratory wave in order to increase the efficiency of the application of the wave to the mirror.

Preferably, a connection between a dead wire and an electrode of the vibrator is formed by a clamping action to avoid problems associated with solder.

Preferably, a molding material occupies the space between the rear surface of the mirror and a terminal for the lead wire to dampen vibrations of the terminal.

BRIEF DESCRIPTION OF THE DRAWINGS

For a better understanding of the invention, and to show how the same may be carried out into effect, reference will now be made, by way of example, to the accompanying drawings, in which.

DESCRIPTION OF PREFERRED EMBODIMENTS OF THE INVENTION

Hereinafter, a preferred embodiment of the present invention will be described in detail with reference to the accompanying drawings.

Figure 1:
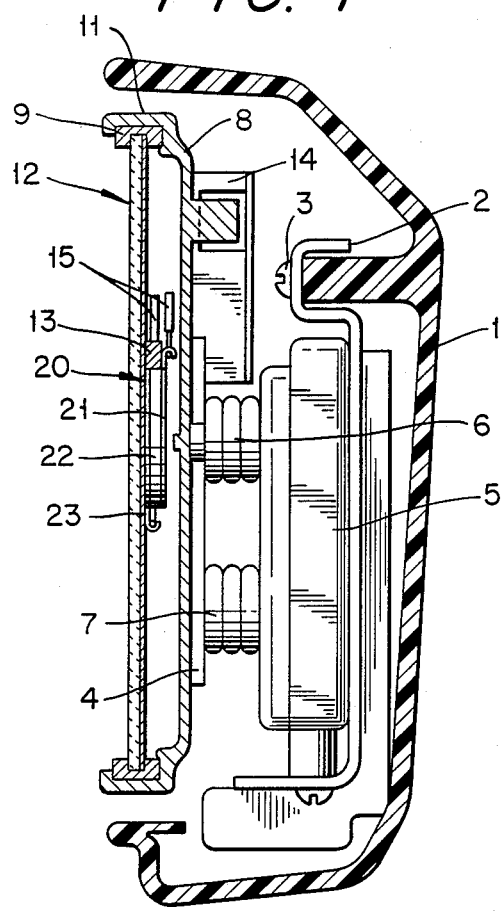
FIG. 1 is a cross sectional view through a mirror cleaning device for a vehicle according to a preferred embodiment of the present invention.

In FIG. 1, a metal frame 2 is fixed by a screw 3 to the interior of a mirror case 1 made of synthetic resin, the case being fixed to the body (not shown) of a vehicle. A mirror base 4 made of synthetic resin is pivotally attached to the frame 2 by a conventional ball mount to be movable up and down as well as right and left. A conventional mirror adjusting driving device 5 is fixed to the frame 2 by screws. The mirror position adjusting device 5 has two output rods (not shown) capable of independent movement. The ends of the two output rods are connected at different positions on one surface of the mirror base 4. When one or both output rod(s) are driven in response to suitable actuation by the vehicle operator, the mirror 4 is inclined up and down or right and left. The output rods are covered respectively by covers 6, 7 made of synthetic rubber. One end of each cover is joined to the housing of mirror position adjusting device 5, and the other end of the cover is joined to the mirror base 4. Further, said covers 6, 7 are flexible, e.g., are of bellows shape so as not to influence the inclination of the base 4.

A mirror frame 8 made of synthetic resin or aluminum and the like is joined to the mirror base 4. A coupling recess 11 is provided at the external circumference of the frame 8, and a supporting member 9 made of synthetic resin such as synthetic rubber or polyurethane and the like material having less acoustic impedance than the acoustic impedance of the mirror 12 is inserted and adhered around the entire circumferential edge of the mirror 12. The coupling recess 11 holds the entire circumferential edge of the plate-shaped mirror 12 through this supporting member 9. An ultrasonic vibrator 20 is joined to the mirror 12. More specifically, an electrode terminal 23 of the ultrasonic vibrator 20 is joined to the rear surface of the mirror 12.

Figure 2A:
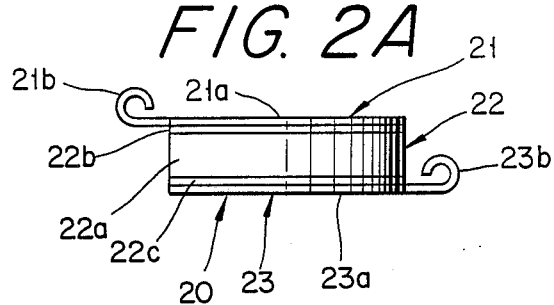
FIGS. 2A and 2B are, respectively, side and front views of an ultrasonic vibration of the mirror cleaning device.
Figure 2B:
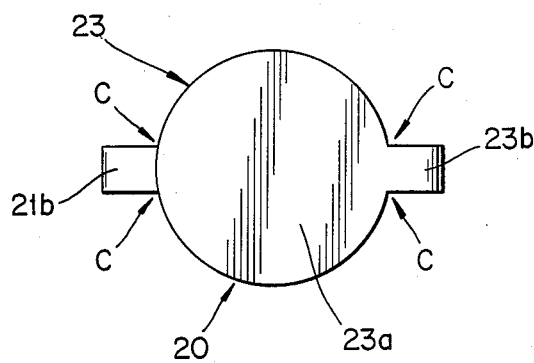

The ultrasonic vibrator 20 comprises a conventional ultrasonic vibrating element 22 made of electrostrictive ceramics utilizing a piezoelectric effect. The ultrasonic vibrating element 22, as shown in FIG. 2, comprises electrodes 22b and 22c which sandwich therebetween an electrostrictive ceramics element 22a. Connected to the electrode 22c is a mirror-side electrode terminal 23 and mirror remote-side electrode terminal 21. The mirror-side electrode terminal 23 and mirror remote-side electrode terminal 21 as well as the ultrasonic vibrating element 22 form the ultrasonic vibrator 20.

Further, the mirror side electrode terminal 23 has an electrode surface portion 23a substantially equal in size to the electrode 22c to be connected therewith and a terminal connecting portion 23b projecting from the electrode surface portion 23a. The remote-side electrode terminal 21 has an electrode surface portion 21a substantially equal in size to the electrode 22b to be connected therewith and a terminal connecting portion 21b projecting from the electrode surface portion 21a. Terminal connecting portions 21b and 23b are of tube-like shape, their ends being bent toward the opposite side of the element 20. Lead wires 15 are inserted into those tubes and the tubes are pressed and/or riveted to achieve an electrical and mechanical connection.

The space between the rear surface of the mirror and a terminal defined by the connection of the connection portion 21b and a lead wire 15 is occupied by molding material 13 made of a rubber, plastic or synthetic resin material which is an insulating substance. The material 13 is joined integrally with the rear surface of the mirror 12. That material suppresses independent vibration of the terminal.

A standard vibrator control device 14 is disposed between the mirror case 1 and the mirror base 4 to a side of the mirror base 4 facing the case 1. Said vibrator control device 14 contains a conventional oscillating circuit and a conventional power supply circuit for driving the ultrasonic vibrator 20. Further, said vibrator control device 14 is controlled by a switch mounted within the vehicle.

The aforedescribed mirror cleaning device may be operated as follows.

When the ultrasonic vibrator 20 is driven by the vibrator control device 14, a vibratory wave is applied to the mirror 12 having a predetermined curvature, whereby water drops, ice, frost, mist and the like are removed from the surface of the mirror 12 by a pulverizing action resulting from the ultrasonic vibration and by the heat produced therewith.

Since the supporting member 9, made of a material having less acoustic impedance than that of mirror 12, is arranged between the mirror 12 and mirror frame 8, the mirror 12 itself constitutes substantially the entire load vibrated by ultrasonic vibrator 20. Therefore, the predetermined ultrasonic vibration can vibrate the mirror 12 with high efficiency, and the ultrasonic vibration energy is not consumed by another component, such as, for example, the mirror frame 8.

Alternatively, the supporting member 9 may comprise circumferentially spaced segments. In that case, since the acoustic impedance is less than the aforementioned embodiment, the loss of the ultrasonic vibration energy can be even further reduced.

However, if the supporting member 9 is arranged to be circumferentially uninterrupted, the sealing effect between the mirror 12 and the mirror frame 8 is maximized. For example, in case that synthetic rubber or synthetic resins and the like having high elasticity is employed as a supporting member 9, the sealing effect around the mirror can be made particularly better.

When the wave is induced with high efficiency to the mirror 12, the nature of the terminal connecting portion 21b connected electrically mechanically with the lead wire 15 of the electrode terminal 21 of the mirror remote-side of the vibrator 20 may be changed. In the past, when the lead wire 15 is joined to the electrode terminal 21 by soldering and the like, the ultrasonic vibration operates to exfoliate the solder and break the connection.

In accordance with the present invention, however, the terminal connecting portion 21b is connected to the lead wire 15 of the electrode terminal 21 by clamping, instead of solder. Thus, the connection between the lead wire 15 and the terminal connecting portion 21b of the electrode terminal 21 is not as easily broken. Furthermore, connecting by means such as riveting or crimping is effected without applying heat, means that no thermal distortion can occur and the mechanical strength of the connection will not be reduced. Another type of suitable clamping connection, involves a plurality of parallel strips forming the terminal connecting portion 21b; each of the strips is secured at one end, whereby the free end is flexible. The lead wire 15 is inserted so as to be held resiliently by the plurality of strips.

Furthermore, the type of clamping used for attaching a wire to the electrode 21 can also be used for the other electrode 23. This simplifies the clamping procedure by enabling the same tool to be used for both.

Figure 3:
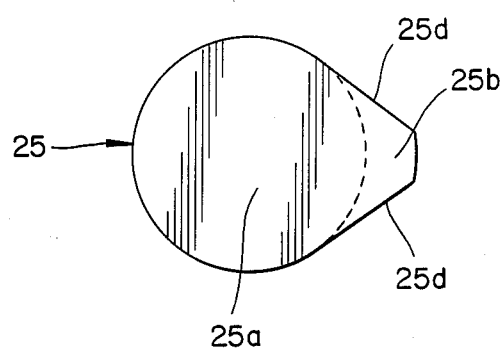
FIG. 3 is a front view of an alternative form of electrode terminal for use with the ultrasonic vibrator.
Figure 4:
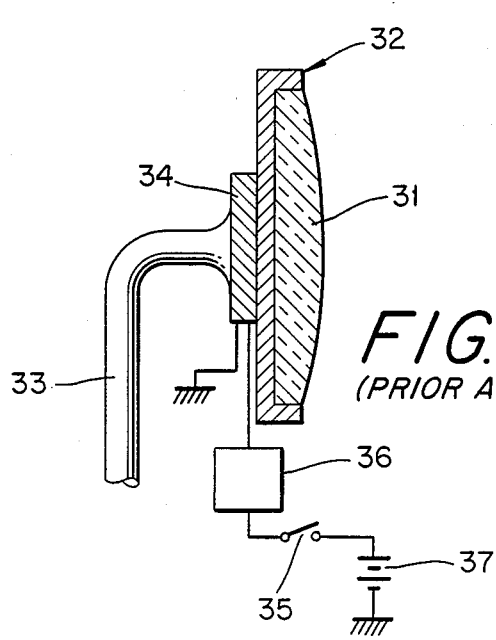
FIG. 4 is a cross sectional view of a conventional mirror cleaning device for a vehicle.

Since the terminal connecting portions 23b and 21b are rectangular and project from circular surfaces 23a, 21a, respectively, sharp corners C are formed which are susceptible to stress fractures after prolonged applications of ultrasonic vibration. In accordance with another embodiment of the present invention depicted in FIG. 3, it is preferred to form a tapered terminal connecting portion 25b projecting from the electrode surface 25a of the electrode terminal 25. The portion 25b is formed by edges 25d which are tangent to the periphery of the surface 25a, whereby no sharp corners are formed which would be susceptible to stress fatigue. Rather, a smooth transition is formed.

In addition, since the terminal connecting portion 21b connected with said lead wire 15 is electrically and mechanically engaged by the elastomeric molding material 13 (e.g., made of materials from the rubber group or synthetic resin group) which is an insulation material, and since the material 13 is joined integrally with the rear surface of the mirror 12, a tendency for the terminal connecting portion 21b to vibrate independently is suppressed by the molding material 13 and the rear surface of the mirror 12. Thus, fatigue of the terminal connecting portion 21b can be minimized, and the loss of electrical connection due to either a distortion between the terminal connecting portion 21b and the electrode surface portion 21a or a breakage of the wire of lead wire 15 can be prevented. Hence, the reliability of the electrical and mechanical connection at the terminal is enhanced. This is also true when engaging the terminal connecting portion 23b of the electrode terminal 23 with the molding material 13, and joining the material 13 integrally with the rear surface of the mirror 12.

When the material for the terminal connecting portion 21b of the electrode terminal 21 is deposited and joined integrally with the rear surface of the mirror 12, at the same time, the material 13 for the terminal connecting portion 23b of the electrode terminal 23 is also deposited and joined integrally with the rear surface of the mirror 12. Even if the terminal connecting portion 21b and the terminal connecting portion 23b were connected by solder rather than by clamping, the presence of the material 13 would protect the connection and resist breakage of the connection.

If desired, the electrodes 22b, 22c could be deleted, whereby the element 22a would be secured directly between the terminals 21, 23.

In summation, a mirror cleaning device for a vehicle according to the present invention includes a mirror having predetermined curvature, an ultrasonic vibrator joined to its rear surface, and a mirror frame fixed with the mirror through a supporting member made of less acoustic impedance material than that of the mirror at the circumferential edge of said mirror. Accordingly, the mirror constitutes means vibratable by the ultrasonic vibrator independently of the mirror frame, whereby the vibration wave of predetermined frequency can be induced efficiently to the surface of the mirror.

When the supporting member applied to the periphery of said mirror is arranged around the entire circumference of said mirror, the sealing effect between the mirror and the mirror is maximized.

When the supporting member applied to the periphery of said mirror is circumferentially interrupted at one or more intervals, the acoustic impedance can be decreased as compared with the supporting member which extends around the entire periphery.

Further, in an article according to the invention comprising a mirror of predetermined curvature, an ultrasonic vibrator joined to its rear surface, and terminal connecting portions projecting from the electrode terminals of the vibrator and clamped to lead wires, the clamped type of securement of the wire connection is able to withstand the vibration the applied to the connecting portion. There is no solder joint which could be exfoliated by the ultrasonic vibration.

Also, by clamping the terminal connecting portion to the lead wire, e.g. by pressing or crimping, the connection can be effected without applying a heat to the terminal connecting portion. Thus, no thermal distortion will occur, and the mechanical strength of the terminal connecting portion is not decreased.

If the terminal connecting portion is pressed and connected to the lead wire by pressure, the fact that the lead wire can be pressed and connected by the resilient force of itself, leads to the result that no adverse effect from ultrasonic vibration appears even after prolonged use.

If the terminal connecting portion is formed gradually with tapering sides, a smooth transition with the electrode surface terminal is created, whereby force concentrations are avoided, and the reliability of connection can be raised.

In an article according to the invention comprising a mirror having predetermined curvature, an ultrasonic vibrator joined to its rear surface, the electrode terminals having projecting terminal connecting portions connected to lead wires, and a molding material for occupying the space between the lead wire terminal and the rear surface of the mirror, the molding material being joined integrally with the rear surface of the mirror, a risk that the terminal connecting portion will vibrate independently is suppressed by the molding material and the rear surface of the mirror. Therefore, fatigue of the terminal connecting portion can be decreased, and a loss of electrical connection as the result of either distortion between the terminal connecting portion and the electrode surface portion, or a breaker of the wire can be prevented.

By providing a vibration-suppressing material for both terminal connecting portions of said ultrasonic vibrator, the reliability of the terminal connecting portions can be raised even further.

On the other hand, by providing a vibration-suppressing material for only the terminal connecting portion located remote from the mirror, the time for injecting the molding material can be decreased by one half.

Although the present invention has been described in connection with a preferred embodiment thereof, it will be appreciated by those skilled in the art that additions, substitutions, modifications, and deletions, not specifically described may be made without departing from the spirit and scope of the invention as defined in the appended claims.

What is claimed is:

1. A self-cleaning mirror for a vehicle comprising:
   a mirror of predetermined curvature;
   an ultrasonic vibrator joined to a rear surface of said mirror; and
   a mirror frame attached to an outer circumference of said mirror by means of a supporting member made of a material having less acoustic impedance than said mirror.

2. Apparatus according to claim 1, wherein said supporting member is arranged around the entire outer circumference of said mirror.

3. Apparatus according to claim 1, wherein said supporting member is circumferentially interrupted at least at one interval around said outer circumference of said mirror.

4. A self-cleaning mirror for a vehicle comprising
   a mirror of predetermined curvature,
   an electric control means, and
   an ultrasonic vibrator joined to a rear surface of said mirror and electrically connected to said control means, said ultrasonic vibrator including:
   a vibratory element, and
   first and second electrode terminals mounted on first and second sides, respectively, of said vibratory element, each electrode terminal including a projecting connection portion clamped to a lead wire from said control means.

5. Apparatus according to claim 4, wherein each of said terminal connecting portions is mechanically crimped to its respective lead wire.

6. Apparatus according to claim 4, wherein each of said terminal connecting portions is elastically resilient and clamped to its respective lead wire by means of said resiliency.

7. Apparatus according to claim 4 wherein each of said electrode terminals includes a disk portion connected to said vibratory element, said connecting portion projecting outwardly from said disk portion in the same plane as said disk portion, said connecting portion including side edges forming smooth transitions with an outer peripheral edge of said disk portion.

8. A self-cleaning mirror for a vehicle comprising:
   a mirror of predetermined curvature,
   an electric control means, and
   an ultrasonic vibrator joined to a rear surface of said mirror and electrically connected to said control means, said ultrasonic vibrator including:
   a vibratory element,
   first and second electrode terminals mounted on first and second sides, respectively, of said vibratory element, each electrode terminal including a projecting connecting portion connected to a lead wire from said control means, and a molding material occupying a space between a rear side of said mirror and a terminal defined by a connection between said connecting portion and lead wire, said molding material suppressing vibration of said connecting portions.

9. Apparatus according to claim 8 wherein each of said electrode terminals includes a disk portion connected to said vibratory element, said connecting portion projecting outwardly from said disk portion in the same plane as said disk portion, said connection portion including side edges forming smooth transitions with an outer peripheral edge of said disk portion.

* * * * *